United States Patent [19]
Attarwala et al.

[11] Patent Number: 6,043,327
[45] Date of Patent: Mar. 28, 2000

[54] ANAEROBIC ADHESIVE COMPOSITIONS OF ACRYLATES COREACTANTS AND MALEIMIDES CURABLE UNDER AMBIENT CONDITIONS

[75] Inventors: Shabbir Attarwala, West Hartford, Conn.; Gina M. Mazzella, Durham, N.C.

[73] Assignee: Loctite Corporation, Hartford, Conn.

[21] Appl. No.: 08/888,002

[22] Filed: Jul. 3, 1997

[51] Int. Cl.$^7$ .................................................. C08F 220/52
[52] U.S. Cl. .......................... 526/259; 526/261; 526/265
[58] Field of Search .................................. 526/261, 259, 526/265

[56] References Cited

U.S. PATENT DOCUMENTS

| | | | |
|---|---|---|---|
| 3,218,305 | 11/1965 | Krieble | 260/89.5 |
| 3,988,299 | 10/1976 | Malofsky | 260/47 UA |
| 4,049,750 | 9/1977 | Brenner | 260/864 |
| 4,107,109 | 8/1978 | Kassal | 260/4 R |
| 4,180,640 | 12/1979 | Melody et al. | 526/323.1 |
| 4,209,604 | 6/1980 | Werber | 526/270 |
| 4,216,134 | 8/1980 | Brenner | 260/40 R |
| 4,287,330 | 9/1981 | Rich | 526/270 |
| 4,321,349 | 3/1982 | Rich | 526/270 |
| 4,384,101 | 5/1983 | Kovacs et al. | 528/73 |
| 4,443,366 | 4/1984 | Sakagami et al. | 260/112 R |
| 4,524,176 | 6/1985 | Pike et al. | 525/12 |
| 4,600,738 | 7/1986 | Lamm et al. | 523/500 |
| 4,624,725 | 11/1986 | Lamm et al. | 156/310 |
| 5,023,107 | 6/1991 | Roberts | 427/2 |
| 5,079,315 | 1/1992 | Demarey | 525/509 |
| 5,302,679 | 4/1994 | Maandi et al. | 526/262 |

OTHER PUBLICATIONS

L.J. Baccei and B.M. Malofsky, "Anaerobic Adhesives Containing Maleimides Having Improved Thermal Resistance" in *Adhesive Chemicals*, 589–601, L–H Lee, ed., Plenum Publishing Corp. (1984).

F.J. Campbell et al., "Electron Beam Curing Improves High Temperature Strength of Vinyl Ester Adhesives", Natl. SAMPE Symp. Exh., 59–63 (1977).

R.D. Rich, "Anaerobic Adhesives" in *Handbook of Adhesive Technology*, 29, 467–79, A. Pizzi and K.L. Mittal, eds., Marcel Dekker. Inc., New York (1994).

*Primary Examiner*—Christopher Henderson
*Attorney, Agent, or Firm*—Steven C. Bauman

[57] ABSTRACT

The present invention is directed to an anaerobic adhesive composition which includes an acrylate monomer; a coreactant monomer; and an anaerobic cure-inducing composition. The composition may also include a maleimide compound. Reaction products of compositions in accordance with this invention exhibit superior resistance to thermal depredation, such as under elevated temperature conditions.

22 Claims, No Drawings

ANAEROBIC ADHESIVE COMPOSITIONS OF ACRYLATES COREACTANTS AND MALEIMIDES CURABLE UNDER AMBIENT CONDITIONS

BACKGROUND OF THE INVENTION

1. Field of the Invention

The present invention is directed to anaerobic adhesive compositions which include an acrylate component; a coreactant; and an anaerobic cure-inducing composition. The compositions may also include a maleimide component. Reaction products of the compositions of this invention exhibit superior resistance to thermal degradation, particularly under elevated temperature conditions.

2. Brief Description of the Technology

Anaerobic adhesive compositions generally are well-known. See e.g., R. D. Rich, "Anaerobic Adhesives" in *Handbook of Adhesive Technology*, 29, 467–79, A. Pizzi and K. L. Mittal, eds., Marcel Dekker. Inc., New York (1994) and references cited therein. Their uses are legion and new applications continue to be developed.

The patent literature points out examples of related anaerobic adhesives, several of which are discussed here.

For instance, U.S. Pat. No. 4,524,176 (Pike) refers to an anaerobic adhesive which includes the reaction product of an hydroxyl-containing polyester and a glycidyl acrylate. The polyesters which are said to be useful in that composition are reported as having a viscosity at room temperature of between 5,000 to 50,000 cps (col. 2, lines 52–55). The '176 patent also refers to the addition of a modifier—i.e., triallyl cyanurate—to alter flexibility and bond strength of the cured adhesive. Four compositions are recorded which include 10 weight percent triallyl cyanurate (nos. 3–6 in Table III of the '176 patent), each of which are stated as curing at a temperature of 170° C. for a period of time of 30 minutes. The only compositions recorded in Table III which cured at room temperature (requiring 16 hours) (nos. 9–11) do not contain triallyl cyanurate.

U.S. Pat. No. 4,600,738 (Lamm) and U.S. Pat. No. 4,624,725 (Lamm) each refer to a two-component acrylic modified polyester adhesive. The required components are (a) the acrylic modified polyester reaction product of a glycidyl acrylate and a hydroxyl containing polyester and (b) an organometallic acid salt containing a polymerizable monomer, which acts as a primer to enhance the degree to which the acrylic modified polyester adheres to a surface.

U.S. Pat. No. 4,216,134 (Brenner) speaks to one-component anaerobic adhesive compositions which include ethylenically unsaturated diluent monomers (such as styrene, divinylbenzene, diallyl carbonates, diallyl maleate, diallyl phthalate, diallyl isophthalate and the like), prepolymers (such as 1,2-polybutadienes and copolymers thereof, isophthalic polymers, bisphenol A fumates, epoxy resins, polyallylvinyl ethers and the like) and triallyl cyanurate or triallyl isocyanurate as reaction components. Included among the diluent monomers of the '134 patent are polyfunctional acrylates and (meth)acrylates. The '134 patent is at least a three component composition (in addition to its cure components) and requires a prepolymer which may be included in addition to or as a replacement for the ethylenically unsaturated diluent monomer. Examples of the prepolymer are given as "high vinyl 1,2-polybutadienes and copolymers thereof especially styrene; isophthalic polymers; bisphenol A fumates and other alkyls; epoxy resins; polyalkyl vinylethers and related polymers; alkylic resins based on polyfunctional ethers and esters and mixtures of two or more of these prepolymers." (Col. 5, lines 32–39.)

U.S. Pat. No. 4,107,109 (Kassal) refers to a composition for making graft copolymers under anaerobic conditions at elevated temperatures, such as 120° C. to 180° C. The composition includes a solution of certain uncured elastomers in a polymerizable vinyl monomer and a thermally activatable modified peroxide initiator. When polymerized, the elastomer is said to form a continuous phase with the resulting vinyl polymer forming a separate and discrete phase. Bismaleimide, triallyl cyanurate and isocyanurate are noted as optional components which may be employed in the polymerization reaction.

U.S. Pat. No. 5,023,107 (Roberts) refers to a hard tissue surface treatment using a bisbiguanide primer prior to application of an adhesive, which itself may include polymerizable monomers such as glycol dimethacrylate, diallyl phthalate and triallyl cyanurate.

U.S. Pat. No. 3,988,299 (Malofsky) refers to a heat curable composition having improved thermal properties, which includes certain acrylate monomers and maleimide compounds.

And L. J. Baccei and B. M. Malofsky, "Anaerobic Adhesives Containing Maleimides Having Improved Thermal Resistance" in *Adhesive Chemicals*, 589–601, L- H Lee, ed., Plenum Publishing Corp. (1984) report the use of maleimides—specifically, N-phenyl maleimide, m-phenylene dimaleimide and a reaction product of methylene dianiline and methylene dianiline bismaleimide—to increase the thermal resistance of anaerobic adhesives which are fully cured at temperatures of at least 150° C.

F. J. Campbell et al., "Electron Beam Curing Improves High Temperature Strength of Vinyl Ester Adhesives", Natl. SAMPE Symp. Exh., 59–63 (1977) speaks to radiation curing of acrylic-modified epoxies together in formulations with vinyl functional monomers (i.e., divinyl benzene, triallyl cyanurate and styrene) to form cured resins of higher level cross-linking and superior ambient and elevated temperature performance.

U.S. Pat. No. 4,384,101 (Kovacs) relates to thermosetting resin mixtures which contain epoxide components, isocyanate components, latent-hardening components and triallyl cyanurate as a cross-linking compound.

Notwithstanding the state-of-the-technology, a one-part, anaerobic adhesive composition would be desirable which is capable of curing under ambient environmental conditions, and which, when cured into a reaction product, demonstrates superior properties, such as superior resistance to thermal degradation at elevated temperatures.

SUMMARY OF THE INVENTION

The present invention meets the desire discussed above by providing one-part, anaerobic adhesive compositions, reaction products of which exhibit superior performance at elevated temperatures. The compositions include an acrylate component; a coreactant; and an anaerobic cure-inducing composition. The compositions may also include a maleimide component.

The coreactant may be selected from polymerizable materials within structures I and II represented as:

I

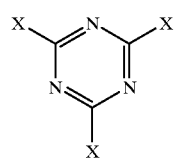

II

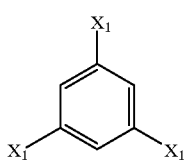

where X is present at least once on structure I (i.e., mono-, di- or tri-substituted) and itself may be chosen from H or DA, where D may be chosen from O, S or NH, and A is represented by structure III below:

III

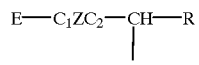

where Z represents a point of unsaturation, such as (a) a double bond with a second H being attached to $C_1$ and an H or halogen being attached to $C_2$, or (b) a triple bond;

E may be H, or linear, branched or cyclic alkyl, alkenyl, alkynyl, alkoxy, or aryl groups having from 1 to about 20 carbon atoms, with or without substitution by halogen, silicon, hydroxy, nitrile, ester, amide or sulfate, provided that additional point(s) of unsaturation or heteroatoms, if any, in the groups represented by R (described below) are not alpha to Z; and R may be H, or linear, branched or cyclic alkyl, alkenyl, alkynyl, alkoxy, or aryl groups having from 1 to about 20 carbon atoms, with or without substitution by halogen, silicon, hydroxy, nitrile, ester, amide or sulfate; and $X_1$ is present at least once on structure II (i.e., mono-, di- or tri-substituted) and itself may be chosen from H or

where D and A are as defined above.

More specific examples of structures I and II, therefore, include structures IV and V, respectively, as depicted below:

IV

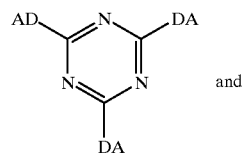

and

V

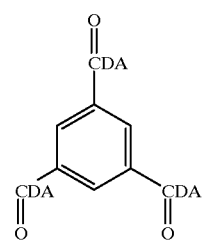

The coreactant may also be chosen from within structure VI as shown below, where D and A are present at least once and are also present together attached to ring atoms which are in alpha-beta relation to one another, as is depicted in the structure

VI

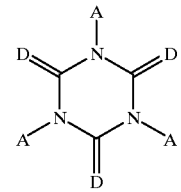

Other coreactants suitable for use herein include those within structures XIII, VII and VIII, as shown below.

XIII

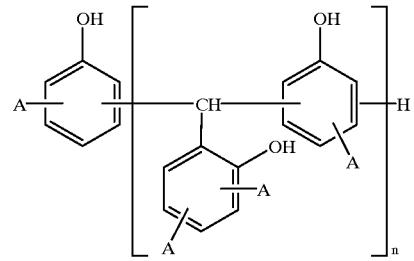

where A is as defined above and n is from 0 to about 5, and

VII

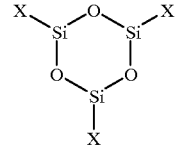

VIII

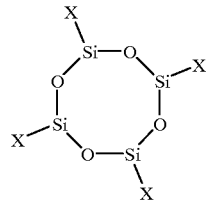

where X is as recited above.

Other polymerizable materials are also suitable for use herein as are described in the section entitled "Detailed Description of the Invention" set forth hereinafter.

The invention also provides a process for preparing a reaction product from the one-part, anaerobic adhesive compositions of the present invention, the steps of which include applying the composition to a desired substrate surface and exposing the coated substrate surface to conditions which are appropriate to effect cure thereof—e.g., exposure to conditions in which air is substantially excluded therefrom.

Also, the invention provides reaction products so-formed by the above-described process, which reaction products demonstrate superior thermal properties, such as resistance to degradation at elevated temperatures.

The present invention will be more fully appreciated by a reading of the detailed description and the illustrative examples which follow thereafter.

DETAILED DESCRIPTION OF THE INVENTION

As noted above, the present invention is directed to anaerobic adhesive compositions which include an acrylate component; a coreactant; and an anaerobic cure-inducing composition. The compositions may also include a maleimide component. Reaction products of the compositions of this invention exhibit superior performance, particularly under elevated temperature conditions.

The acrylate monomer suitable for use in the present invention may be chosen from a wide variety of materials represented by $H_2C=CGCO_2R^1$, where G may be hydrogen, halogen or alkyl of 1 to about 4 carbon atoms, and $R^1$ may be selected from alkyl, cycloalkyl, alkenyl, cycloalkenyl, alkaryl, aralkyl or aryl groups of 1 to about 16 carbon atoms, any of which may be optionally substituted or interrupted as the case may be with silane, silicon, oxygen, halogen, carbonyl, hydroxyl, ester, carboxylic acid, urea, urethane, carbamate, amine, amide, sulfur, sulonate, sulfone and the like.

More specific acrylate monomers particularly desirable for use herein include polyethylene glycol di(meth) acrylates, bisphenol-A di(meth)acrylates, such as ethoxylated bisphenol-A (meth)acrylate ("EBIPMA"), tetrahydrofurane (meth)acrylates and di(meth)acrylates, hydroxypropyl (meth)acrylate, hexanediol di(meth)acrylate, trimethylol propane tri(meth)acrylate, an acrylate ester corresponding to structure IX as shown below:

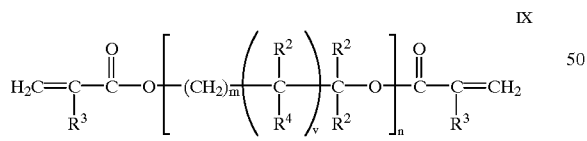

IX where $R^2$ may be selected from hydrogen, alkyl of 1 to about 4 carbon atoms, hydroxyalkyl of 1 to about 4 carbon atoms or

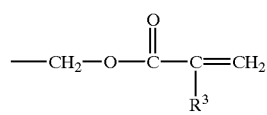

$R^3$ may be selected from hydrogen, halogen, and alkyl of 1 to about 4 carbon atoms;

$R^4$ may be selected from hydrogen, hydroxy and

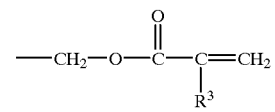

m is an integer equal to at least 1, e.g., from 1 to about 8 or higher, for instance, from 1 to about 4;

n is an integer equal to at least 1, e.g., 1 to about 20 or more; and v is 0 or 1.

Of course, combinations of these acrylate monomers may also be used.

The coreactant may be selected from monomers within structures I and II, which are represented as:

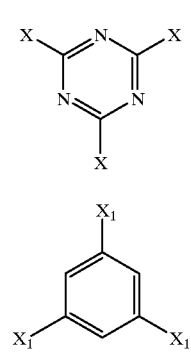

where X is present at least once on structure I (i.e., mono-, di- or tri-substituted) and itself may be chosen from H or DA, where D may be chosen from O, S or NH, and A is represented by structure III below:

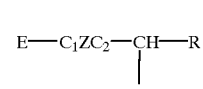

III where Z represents a point of unsaturation, such as (a) a double bond with a second H being attached to $C_1$ and an H or halogen being attached to $C_2$, or (b) a triple bond;

E may be H, or linear, branched or cyclic alkyl, alkenyl, alkynyl, alkoxy, or aryl groups having from 1 to about 20 carbon atoms, with or without substitution by halogen, silicon, hydroxy, nitrile, ester, amide or sulfate, provided that additional point(s) of unsaturation or heteroatoms, if any, in the groups represented by R (described below) are not alpha to Z; and R may be H, or linear, branched or cyclic alkyl, alkenyl, alkynyl, alkoxy, or aryl groups having from 1 to about 20 carbon atoms, with or without substitution by halogen, silicon, hydroxy, nitrile, ester, amide or sulfate; and $X_1$ is present at least once on structure II (i.e., mono-, di- or tri-substituted) and itself may be chosen from H or

where D and A are as defined above.

More specific examples of structures I and II, therefore, include structures IV and V, respectively, as depicted below:

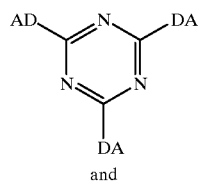
IV and

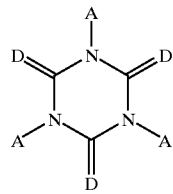
V

With respect to structure VI, D and A are present at least once and are also present together attached to ring atoms which are in alpha-beta relation to one another, as is depicted in the structure

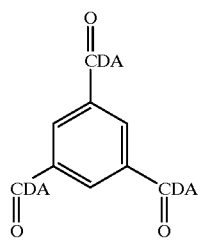
VI

Of the coreactants represented above, particularly desirable ones are represented below by structures X [triallyl cyanurate ("TAC")], XI [triallyl trimesate ("TAT")], and XII [triallyl isocyanurate ("TAI")] as follows:

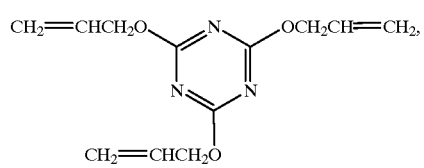
X

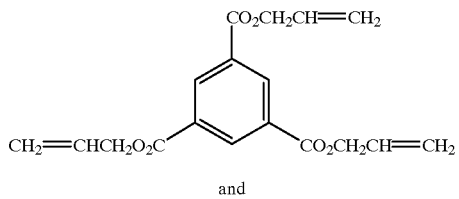
XI and

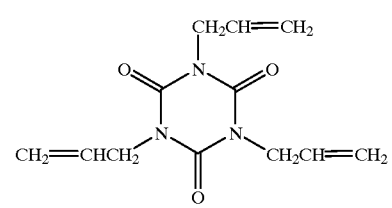
XII

In addition, the coreactant may be a polymerizable substituted phenolic material, such as materials within structure XIII as represented below:

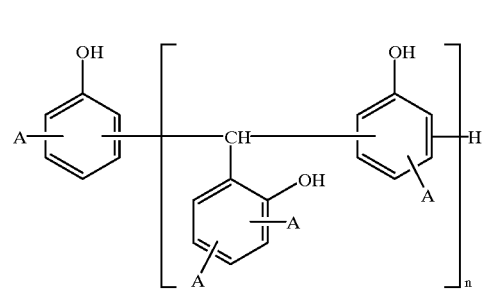
XIII where A is as defined above and n is from 0 to about 5.

A particularly desirable choice of coreactant within structure XIII is represented below by structure XIV:

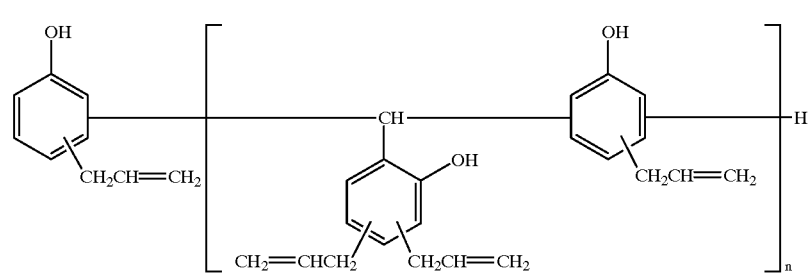
XIV where n is from 0 to about 5, and which is commercially available under the trade designation "THERMAX" SH-150AR from Mitsubishi Petrochemical Co., Ltd., New York, N.Y.

Other coreactants suitable for use herein include those within structures VII and VIII, as shown below.

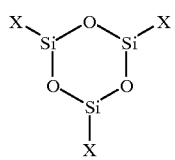

VII

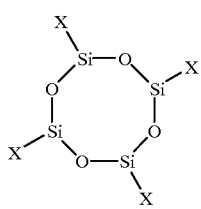

VIII where X is as recited above.

Of course appropriate combinations of these coreactants may also be employed herein.

Many maleimide compounds are suitable for use herein as the maleimide component. Generally, maleimides which are useful herein conform to the following structures:

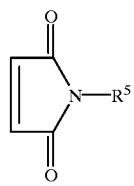

XV

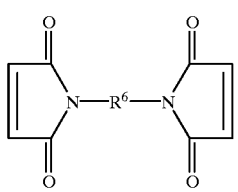

XVI

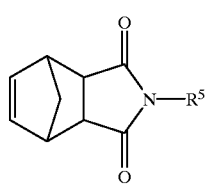

XVII

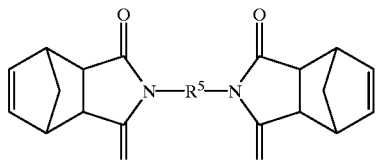

XVIII where $R^5$ and $R^6$ are selected from alkyl, aryl [such as phenyl (mono and polyphenyl) and derivatives thereof, such as nitro, hydroxyl, alkyl and the like], cycloalkyl, aralkyl and alkaryl groups, which should ordinarily contain from about 6 to about 100 carbon atoms, with about 6 to about 50 carbon atoms being desirable, any of which may be optionally substituted or interrupted as the case may be with silane, silicon, oxygen, halogen, carbonyl, hydroxyl, ester, carboxylic acid, urea, urethane, carbamate, sulfur, sulfonate, sulfone and the like. For instance, $R^6$ may represent groups such as

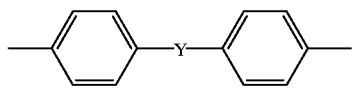

where the phenyl groups are substituted at one or more positions with linear, branched or cyclic alkyl, alkenyl, alkynyl, alkoxy, or aryl groups having from 1 to about 20 carbon atoms, with or without substitution by halogen, hydroxy, nitrile, ester, amide or sulfate; and Y may represent O, S, carbonyl, sulfone, or primary or secondary methylene groups substituted with linear, branched or cyclic alkyl, alkenyl, alkynyl, alkoxy, or aryl groups having from 1 to about 20 carbon atoms, with or without substitution by halogen, hydroxy, nitrile, ester, amide or sulfate.

Desirable maleimides include compounds within structures XV and XVI as shown below as structures XIX [N-phenyl maleimide ("NPM")], XX [bismaleimide ("BMI-30")], XXI [N,N'-(2,2'-diethyl-6,6'-dimethyl-4,4'-methylene diphenylene) bismaleimide ("BMI-70" or "MB-7000", commercially available under the "THERMAX" tradename from Mitsubishi Petrochemical Co., K-I Chemical Industry Co., Ltd., Tokyo, Japan)], XXII [2,2'-bis[4-(4'-maleimidediphenoxy)phenyl]propane ("MB-8000", commercially available under the "THERMAX" tradename from Mitsubishi)], and XXIII [multi-functional maleimide prepared as a condensate of aniline, o-toluidine and terephthaldehyde with maleic anhydride ("MP-2000X"), commercially available under the "THERMAX" tradename from Mitsubishi]:

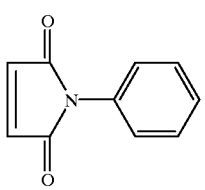

XIX

-continued

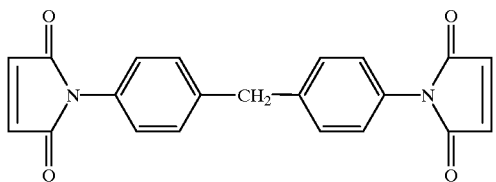

XX

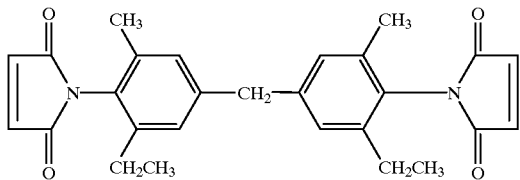

XXI

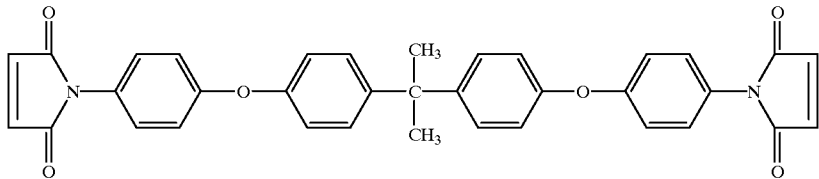

XXII

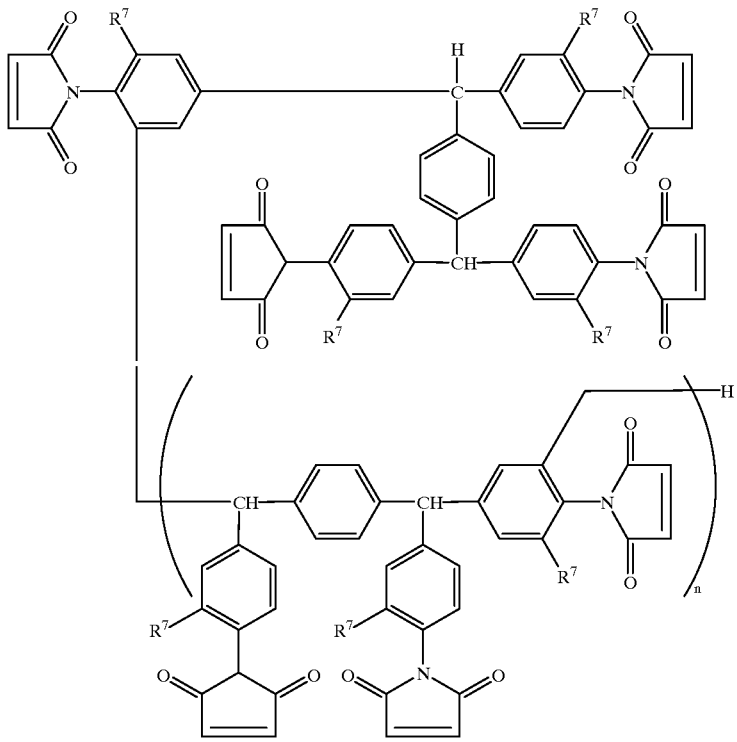

XXIII where $R^7$ may be selected from H or alkyl (such as $CH_3$), and n is an integer within the range of 1 to about 10.

The anaerobic cure-inducing composition useful in the present invention includes a variety of components, such as amines (including amine oxides, sulfonamides and triazines). A desirable composition to induce cure in accordance with the present invention includes saccharin, toluidenes, such as N,N-diethyl-p-toluidene and N,N-dimethyl-o-toluidene, acetyl phenylhydrazine and maleic acid. Of course, other materials known to induce anaerobic cure may also be included or substituted therefor. See e.g., Loctite U.S. Pat. No. 3,218,305 (Krieble), U.S. Pat. No. 4,180,640 (Melody), U.S. Pat. No. 4,287,330 (Rich) and U.S. Pat. No. 4,321,349 (Rich). Quinonones, such as napthoquinone and anthraquinone, may also be included to scavenge free radicals which form.

The inventive compositions may also include other conventional anaerobic and polyacrylate components, such as free radical initiators, free radical accelerators, inhibitors of free radical generation, as well as metal catalysts.

A number of well-known initiators of free radical polymerization may be incorporated into compositions of the present invention including, without limitation, hydroperoxides, such as cumene hydroperoxide ("CHP"), para-methane hydroperoxide, t-butyl hydroperoxide ("TBH") and t-butyl perbenzoate.

Such peroxide compounds may be employed in the present invention in the range of from about 0.1 to about 10 percent by weight of the total composition, with about 0.5 to about 5 percent by weight being desirable.

Stabilizers and inhibitors (such as phenols including hydroquinone and quinones) may also be employed to control and prevent premature peroxide decomposition and polymerization of the composition of the present invention, as well as chelating agents [such as diethylenetriamine pentaacetic acid ("DTPA") or the tetrasodium salt of ethylenediamine tetraacetic acid ("EDTA")] to remove trace amounts of metal contaminants therefrom.

Accelerators may be employed to enhance the rate of cure propagation, such as in amounts in the range of about 0.1 to about 5, desirably about 1 to about 3, percent by weight of the total composition. When the accelerator is in the form of a metal catalyst solution or a pre-mix, it may be used in an amount in the range of about 0.03 to about 0.1% by weight of the total composition. Other agents such as thickeners, plasticizers, fillers, and other well-known additives may be incorporated in the inventive composition where the art-skilled person believes it would be desirable to do so.

The compositions of the present invention may be prepared using conventional methods which are well known to those persons of skill in the art. For instance, the components of the inventive compositions may be mixed together in any convenient order consistent with the roles and functions the components are to perform in the compositions. Conventional mixing techniques using known apparatus may be employed.

The compositions of this invention may be applied to a variety of substrates to perform with the desired benefits and advantages described herein. For instance, appropriate substrates may be constructed from steel, brass, aluminum, zinc, and other metals and alloys.

The compositions of this invention may also be used to impregnate the pores of substrates constructed from such materials.

The compositions of this invention cure as their name connotes under anaerobic conditions. Nevertheless, other cure modalities may also be employed, if desired, provided of course appropriate choices are made for the components of the inventive compositions to render them curable under the desired conditions. For instance, see the '305, '640, '330 and '349 patents.

As with other anaerobic adhesives, the compositions of the present invention are capable of curing in the substantial absence of air. However, unlike some anaerobic adhesive compositions, the compositions of this invention are capable of curing to form a reaction product at ambient environmental conditions, i.e., at room temperature, instead of requiring elevated temperatures. The requirement of elevated temperatures for curing such adhesives increases manufacturing costs due at least in part to increased energy consumption. The so-formed reaction product forms an acceptable bond without requiring a second part primer material, such as is described in the '738 and '725 patents supra. Thus, the inventive compositions are one-part compositions. And the requirement of a second part primer to form an acceptable bond adhesive increases manufacturing costs due at least in part to the required additional material and is also disadvantageous at least in part with respect to lacking the convenience of a one part system.

The following examples are provided to further illustrate the present invention. Many other practical opportunities exist with respect to the teaching herein, which will become readily apparent to those persons of skill in the art upon a review of the examples.

EXAMPLES

A. Preparation of Anaerobic Adhesive Compositions

We prepared anaerobic adhesive compositions using the components and amounts indicated below in Table 1. For comparative purposes, certain of the compositions contained no coreactant and/or maleimide component.

TABLE 1

| Sample No. | Acrylate (by weight %) | Coreactant (by weight %) | Maleimide (by weight %) |
| --- | --- | --- | --- |
| 1 | PEGMA (95) | — | — |
| 2 | PEGMA (75) | TAC (20) | — |
| 3 | PEGMA (60) | TAC (20) | NPM (15) |
| 4 | PEGMA (55) | TAC (20) | NPM (15) |
|   |   |   | BMI-70 (5) |
| 5 | PEGMA (47.6) | TAC (20) | NPM (10) |
|   | EBIPMA (10) |   | BMI-70 (4) |
| 6 | PEGMA (51.2) | TAC (20) | NPM (10) |
|   | EBIPMA (10) |   | BMI-70 (4) |
| 7 | PEGMA (75.5) | TAC (20) | — |
| 8 | PEGMA (75.5) | TAI (20) | — |
| 9 | PEGMA (75) | TAT (20) | — |
| 10 | PEGMA (65.5) | TAI (20) | NPM (10) |
| 11 | PEGMA (65.5) | TAC (20) | NPM (10) |
| 12 | PEGMA (89.8) | TAC (10) | — |
| 13 | PEGMA (79.8) | TAC (20) | — |

For Sample Nos. 1–11, between about 4.5% and about 6% by weight of an anaerobic cure-inducing composition was used. More specifically, for Sample Nos. 1–8 and 10–11, this composition included about 1% by weight of saccharin, about 0.4% by weight of acetyl phenylhydrazine, about 0.7% by weight of N,N-diethyl-p-toluidene, about 0.2% by weight of N,N-dimethyl-o-toluidene, about 1% by weight of maleic acid, and about 0.7% by weight of cumene hydroperoxide was included. For Sample No. 9, the composition included about 2% by weight of saccharin, about 0.2% by weight of acetyl phenylhydrazine, about 0.32% by weight of N,N-diethyl-p-toluidene, about 0.2% by weight of N,N-dimethyl-o-toluidene, about 0.8% by weight of maleic acid, and about 0.6% by weight of cumene hydroperoxide. For Sample Nos. 12 and 13, about 0.2% by weight of dicumyl peroxide was included instead as the anaerobic-cure-inducing composition to be consistent with the express disclosure of the '176 patent. Also, in Sample No. 12, 10% by weight of triallyl cyanurate was used to be consistent with the express disclosure of the '176 patent.

Initially, the compositions were prepared by adding with mechanical mixing at room temperature the appropriate amounts of the acrylate component, and, if any, coreactant and maleimide component in any order to 50 ml beakers, and thereafter adding the appropriate amounts of the components of the desired anaerobic cure-inducing composition (save cumene hydroperoxide with respect to Sample Nos. 1–11).

The components were mixed for an appropriate period of time to allow for dissolution of all of the solid components. With respect to Sample Nos. 1–11, an appropriate amount of cumene hydroperoxide was then added portionwise, with mixing continued for an additional period of time of about 0.5 hours.

The so-formed formulations were stored for further use by covering the beaker ensuring that an air pocket remained between the surface of the formulation and the cover.

B. Application of Anaerobic Adhesive Compositions to Desired Substrate, and Cure Thereof The sample compositions were applied in a wicking application to five sets of pre-assembled degreased ⅜×16 grade 2 nuts and grade 5 bolts, which were then allowed to cure at room temperature for a period of time of about 24 hours and typically up to a period of time of about 72 hours. After the cure time, the nut and bolt assemblies were evaluated for strength and thermal performance through accelerated heat aging as described below.

C. Room Temperature Performance of Cured Anaerobic Adhesive Compositions

The nut and bolt assemblies onto which certain of the samples were applied were evaluated for break strength and prevailing torque after a period of time of about 24 hours at ambient temperature conditions and then again after a period of time of about 72 hours at ambient temperature conditions. The room temperature strength data for Samples Nos. 1–11 are set forth in Tables 2a and 2b below.

TABLE 2a

| Property | Sample No. | | | | |
|---|---|---|---|---|---|
| (in. lbs.) | 1 | 2 | 3 | 4 | 5 |
| 24 hr. Break Strength | 104 | 93 | 165 | 173 | 150 |
| 24 hr. Prevailing Torque | 182 | 206 | 284 | 296 | 269 |
| 72 hr. Break Strength | 106 | 107 | — | — | — |
| 72 hr. Prevailing Torque | 198 | 172 | — | — | — |

TABLE 2b

| Property | Sample No. | | | | | |
|---|---|---|---|---|---|---|
| (in. lbs.) | 6 | 7 | 8 | 9 | 10 | 11 |
| 24 hr. Break Strength | 185 | 78 | 115 | 129 | 144 | 108 |
| 24 hr. Prevailing Torque | 205 | 146 | 164 | 220 | 160 | 215 |
| 72 hr. Break Strength | — | 101 | 124 | 127 | 178 | 92 |
| 72 hr. Prevailing Torque | — | 113 | 194 | 232 | 193 | 154 |

Sample Nos. 12 and 13 did not cure during the 24 hour period under these ambient temperature conditions and thus no values were obtained. However, following the cure procedure set forth in the '176 patent [i.e., (1) elevating the temperature to about 170° C. for a period of time of about 0.5 hours and (2) placing the nut and bolt assemblies in boiling water for a period of time of about 2 hours], the nut and bolt assemblies on which was applied the formulation of Sample Nos. 12 and 13 exhibited a break strength of about 30 inch pounds and 29 inch pounds, respectively, and a prevailing torque of about 136 inch pounds and 201 inch pounds, respectively.

D. High Temperature Performance of Cured Anaerobic Adhesive Compositions

The assemblies were thereafter evaluated after one week of subjection to elevated temperatures of about 400° F., and then again as to those assemblies which used Sample Nos. 1–5 after three weeks and six weeks and as to those assemblies which used Sample Nos. 7–8 and 10–11 after three weeks and sixty-one days at such temperature.

The values obtained from the accelerated heat aging at elevated temperatures are set forth below in Tables 3a and 3b.

TABLE 3a

| Property | Sample No. | | | | |
|---|---|---|---|---|---|
| (in. lbs.) | 1 | 2 | 3 | 4 | 5 |
| Break Strength (1 Week) | 57 | 75 | 104 | 134 | 109 |
| Prevailing Torque (1 Week) | 49 | 84 | 201 | 330 | 254 |
| Break Strength (3 Weeks) | 14 | 36 | 106 | 138 | 92 |
| Prevailing Torque (3 Weeks) | 7 | 34 | 282 | 267 | 225 |
| Break Strength (6 Weeks) | 0 | 30 | 126 | 103 | 95 |
| Prevailing Torque (6 Weeks) | 0 | 67 | 163 | 201 | 91 |

TABLE 3b

| Property | Sample No. | | | | | |
|---|---|---|---|---|---|---|
| (in. lbs.) | 6 | 7 | 8 | 9 | 10 | 11 |
| Break Strength (1 Week) | — | 70 | 25 | 35 | 71 | 66 |
| Prevailing Torque (1 Week) | — | 115 | 63 | 82 | 154 | 145 |
| Break Strength (3 Weeks) | — | 29 | 19 | — | 28 | 47 |
| Prevailing Torque (3 Weeks) | — | 86 | 44 | — | 87 | 71 |
| Break Strength (61 Days) | — | 7 | 4 | — | 6 | 9 |
| Prevailing Torque (61 Days) | — | 6 | 3 | — | 22 | 13 |

Depending on the particular application for which the anaerobic composition is destined, different break strengths and prevailing torque values may be considered acceptable to accomplish the goal at hand. For many applications, break strength is an important parameter because once a fastener (e.g., a nut from a nut and bolt assembly) turns, the clamping force is effectively lost. The prevailing torque value, on the other hand, informs the user of when the fastener will come apart.

For certain applications, a high break strength value is particularly desirable. Examples of those applications are ones where a maintenance-free or tamper-proof machine is the type of apparatus with which such an anaerobic adhesive composition is to be used. For other applications, a low break strength is desirable. Examples of such other applications include removable threadlockers where the machine is desirably maintained at regular intervals. Thus, it is seen that commercially-acceptable anaerobic adhesive compositions will have different break strength and prevailing torque values depending on the use to which that composition is placed.

These examples are provided solely for illustrative purposes, and are in no way intended to limit the spirit and scope of the invention as defined by the claims.

What is claimed is:

1. A one-part, anaerobic adhesive composition, capable of curing under ambient temperature conditions reaction products of which exhibit resistance to thermal degradation at elevated temperatures, comprising:

(a) an acrylate component;

(b) a coreactant component selected from the group consisting of materials within the structures represented by:

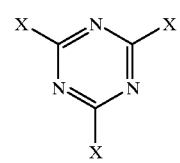

I

-continued

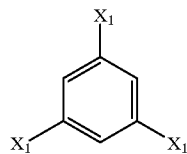

II wherein X is present at least once on structure I and is a member selected from the group consisting of H and DA, wherein D is attached to the ring and is a member selected from the group consisting of O, S and NH and A is attached to D and is represented by structure III:

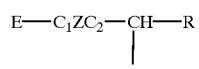

III wherein Z represents (1) a double bond with at least one H being attached to $C_1$ and an H or halogen being attached to $C_2$, or (2) a triple bond; and E is a member selected from the group consisting of H; alkyl, alkenyl, alkynyl, alkoxy, each of which may be linear, branched or cyclic, and aryl groups, each of which having from 1 to about 20 carbon atoms, with or without substitution by halogen, silicon, hydroxy, nitrile, ester, amide and sulfate, provided that additional point(s) of unsaturation or heteroatoms, if any, in the groups represented by R are not alpha to Z;

R is a member selected from the group consisting of H; alkyl, alkenyl, alkynyl, alkoxy, each of which may be linear, branched or cyclic, and aryl groups, each of which having from 1 to about 20 carbon atoms, with or without substitution by a member selected from the group consisting of halogen, hydroxy, nitrile, ester, amide and sulfate; and $X_1$ is present at least once on structure II and is a member selected from the group consisting of H and

wherein D and A are respectively within the group and representation as recited above;

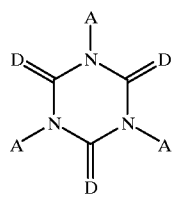

wherein D and A are respectively within the group and representation as recited above;

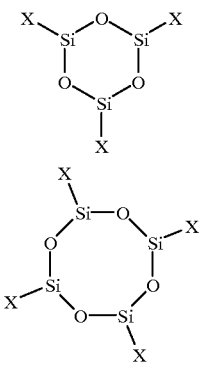

wherein X is as recited above; and

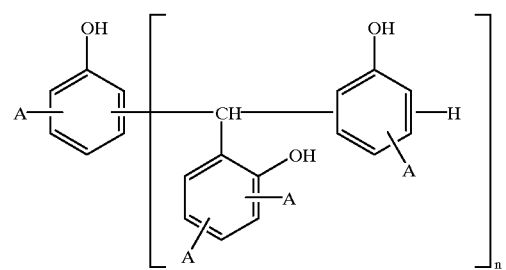

wherein A is within the representation as recited above and n is from 0 to about 5;

(c) a maleimide component; and
(d) an anaerobic cure-inducing composition.

2. The composition according to claim 1, wherein the coreactant component is a member selected from the group consisting of materials within the structures represented by:

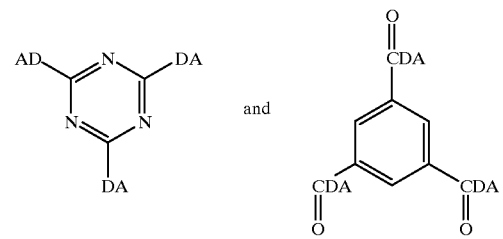

wherein D is a member selected from the group consisting of O, S and NH and A is represented by structure III:

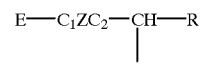

wherein Z represents (1) a double bond with a second H being attached to $C_1$ and an H or halogen being attached to $C_2$, or (2) a triple bond;

E is a member selected from the group consisting of H, and linear, branched or cyclic alkyl, alkenyl, alkynyl, alkoxy and aryl groups having from 1 to about 20 carbon atoms, with or without substitution by a member selected from the group consisting of halogen, silicon, hydroxy, nitrile, ester, amide and sulfate, provided that additional point(s) of unsaturation or heteroatoms, if any, in the groups represented by R are not alpha to Z; and R is a member selected from the grup consisting of H, or linear, branched or cyclic alkyl, alkenyl, alkynyl, alkoxy, or aryl groups having from 1 to about 20 carbon atoms, with or without substitution by a member selected from the group consisting of halogen, silicon, hydroxy, nitrile, ester, amide and sulfate.

3. The composition according to claim 1, wherein the coreactant component is represented by

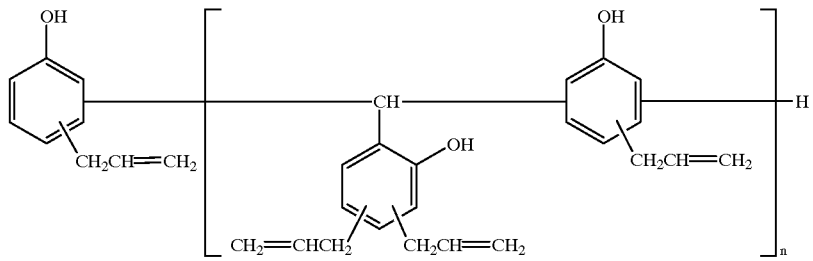

wherein n is 0 to about 5.

4. The composition according to claim 1, wherein the acrylate component is represented by $H_2C=CGCO_2R_1$, wherein G is a member selected from the group consisting of hydrogen, halogen or alkyl of 1 to about 4 carbon atoms, and $R^1$ is a member selected from the group consisting of alkyl, cycloalkyl, alkenyl, cycloalkenyl, alkaryl, aralkyl and aryl groups having from 1 to about 16 carbon atoms, any of which may be optionally substituted or interrupted with a member selected from the group consisting of silane, silicon, oxygen, halogen, carbonyl, hydroxyl, ester, carboxylic acid, urea, urethane, carbamate, amine, amide, sulfur, sulonate and sulfone.

5. The composition according to claim 1, wherein the acrylate is a member selected from the group consisting of polyethylene glycol di(meth)acrylates, bisphenol-A di(meth)acrylates, tetrahydrofurane (meth)acrylates and di(meth)acrylates, hydroxypropyl (meth)acrylate, hexanediol di(meth)acrylate, trimethylol propane tri(meth)acrylate, and an acrylate ester corresponding to

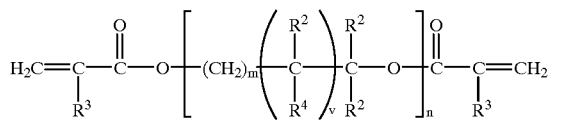

wherein $R^2$ is a member selected from the group consisting of hydrogen, and alkyl and hydroxyalkyl groups having from 1 to about 4 carbon atoms and

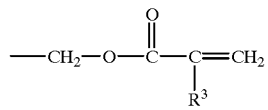

$R^3$ is a member selected from the group consisting of hydrogen, halogen, and alkyl groups having from 1 to about 4 carbon atoms;

$R^4$ is a member selected from the group consisting of hydrogen, hydroxy and

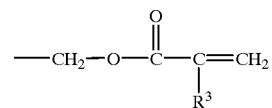

m is an integer equal to at least 1;

n is an integer equal to at least 1; and v is 0 or 1, and combinations of the above acrylate components.

6. The composition according to claim 1, wherein the coreactant is:

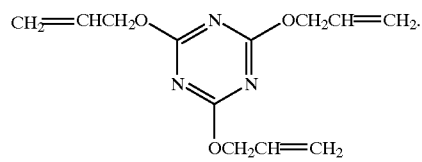

7. The composition according to claim 1, wherein the coreactant is:

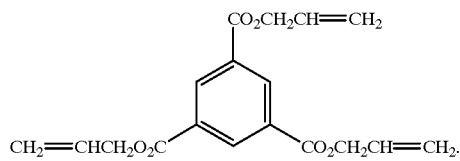

8. The composition according to claim 1, wherein the coreactant is:

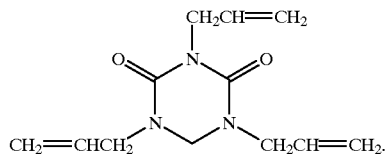

9. The composition according to claim 1, wherein the maleimide component is a member selected from the group consisting of compounds within the structures represented by:

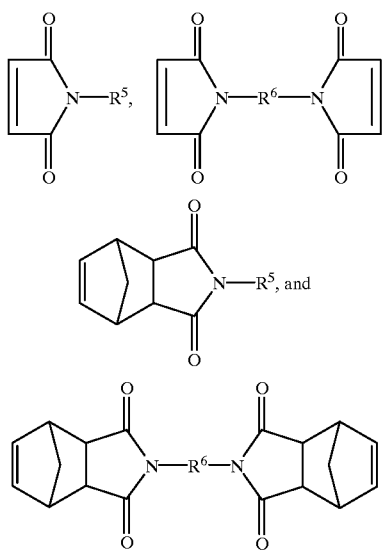

wherein $R^5$ and $R^6$ are each members selected from the group consisting of alkyl, aryl, aralkyl and alkaryl groups, having from about 6 to about 100 carbon atoms, with or without substitution or interruption by a member selected from the group consisting of silane, silicon, oxygen, halogen, carbonyl, hydroxyl, ester, carboxylic acid, urea, urethane, carbamate, sulfur, sulfinate and sulfone.

10. The composition according to claim 1, wherein the maleimide component is:

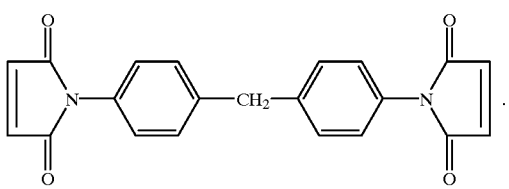

11. The composition according to claim 1, wherein the maleimide component is:

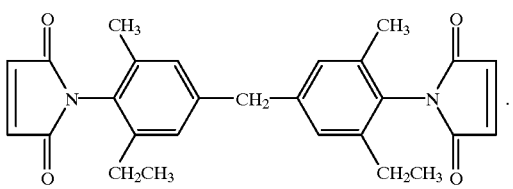

12. The composition according to claim 1, wherein the maleimide component is:

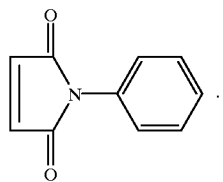

13. The composition according to claim 1, wherein the anaerobic cure-inducing composition comprises saccharin, toluidenes, acetyl phenylhydrazine, maleic acid and cumene hydroperoxide.

14. A reaction product formed from the composition according to claim 1, upon exposure to conditions in which air is substantially excluded therefrom.

15. A one-part, anaerobic adhesive composition capable of curing under ambient temperature conditions, reaction products of which exhibit enhanced performance at elevated temperatures, said composition comprising:

(a) an acrylate component;
(b) a coreactant component selected from the group consisting of materials within structures I and II represented by:

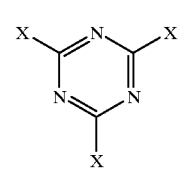

I

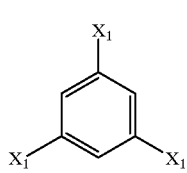

II wherein X is present at least once on structure I and is a member selected from the group consisting of H and DA, wherein D is attached to the ring and is a member selected from the group consisting of O, S and NH and A is attached to D and is represented by:

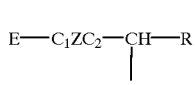

III wherein Z represents (1) a double bond with at least one H being attached to $C_1$ and an H or halogen being attached to $C_2$, or (2) a triple bond;

E is a member selected from the group consisting of H; alkyl, alkenyl, alkynyl, alkoxy, each of which may be linear, branched or cyclic, and aryl groups, each of which having from 1 to about 20 carbon atoms, with or without substitution by a member selected from the group consisting of halogen, silicon hydroxy, nitrile, ester, amide and sulfate, provided that addition points of unsaturation or heteroatoms, if any, in the groups represented by R are not alpha to Z; and R is a member selected from the group consisting of H; alkyl, alkenyl, alkynyl, alkoxy, each of which may be linear, branched or cyclic, and aryl groups, each of which having from 1 to about 20 carbon atoms, with or without substitution by a member selected from the group consisting of halogen, hydroxy, nitrile, silicon, ester, amide and sulfate; and $X_1$ is present at least once on structure II and is a member selected from the group consisting of H and

wherein D and A are respectively within the group and representation as recited above;

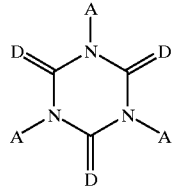

wherein D and A are respectively within the group and representation as recited above;

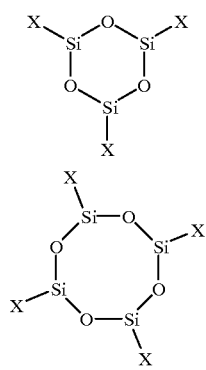

wherein X is as recited above; and

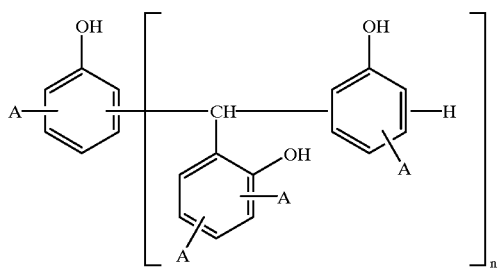

wherein A is within the representation as recited above, and n is from 0 to about 5; and (c) an anaerobic cure-inducing composition.

16. The composition according to claim 15, further comprising a maleimide component.

17. The composition according to claim 16, wherein the maleimide component is a member selected from the group consisting of compounds within the structures represented by:

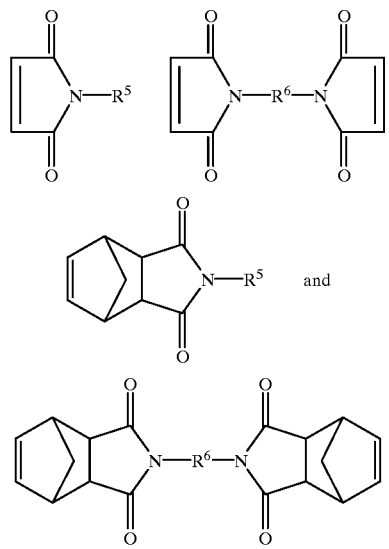

wherein $R^5$ and $R^6$ are each members selected from the group consisting of alkyl, aryl, aralkyl and alkaryl groups, having from about 6 to about 100 carbon atoms, with or without substitution or interruption by a member selected from the group consisting of silane, silicon, oxygen, halogen, carbonyl, hydroxyl, ester, carboxylic acid, urea, urethane, carbamate, sulfur, sulfinate and sulfone.

18. The composition according to claim 16, wherein the maleimide component is:

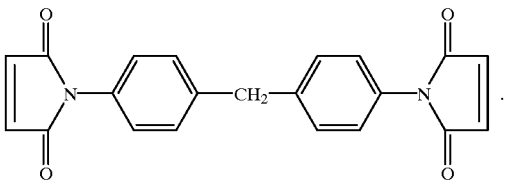

19. The composition according to claim 16, wherein the maleimide component is:

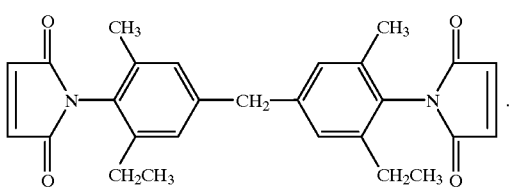

20. The composition according to claim 16, wherein the maleimide component is:

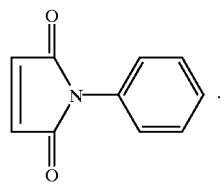

21. A reaction product formed from the compostion according to claim 16, which exposed to conditions in which air is substantially excluded therefrom.

22. A one-part, anaerobic adhesive composition, capable of curing under ambient temperature conditions reaction products of which exhibit enhanced performance at elevated temperatures, comprising:
 (a) an acrylate component comprising the combination of a polyethylene glycol methacrylate and ethoxylated bisphenol-A-dimethacrylate;
 (b) triallyl cyanurate;
 (c) a maleimide component comprising the combination of a bismaleimide and N-phenylmaleimide; and
 (d) a cure-inducing composition comprising the combination of acetyl phenylhydrazine, maleic acid, saccharin, N,N-diethyl-p-toluidene, N,N-dimethyl-o-toluidene and cumene hydroperoxide.

* * * * *

UNITED STATES PATENT AND TRADEMARK OFFICE
CERTIFICATE OF CORRECTION

PATENT NO. : 6,043,327
DATED : March 28, 2000
INVENTOR(S) : Attarwala et al.

It is certified that error appears in the above-identified patent and that said Letters Patent is hereby corrected as shown below:

Column 9,
After line 56, formula XIX should follow line 56 at the bottom of column 10:

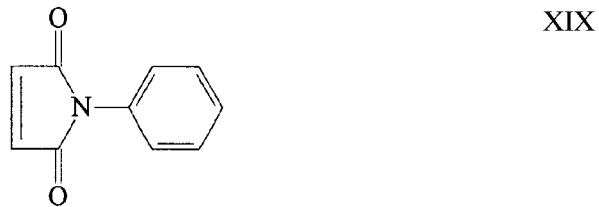

XIX

Line 7, delete the formula and replace it with the following:

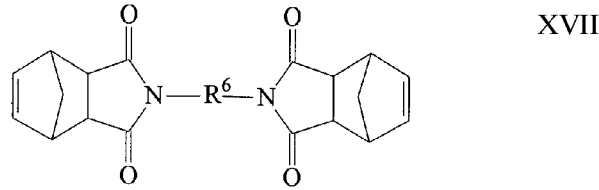

XVII

Column 11,
Delete the formula and replace it with the following:

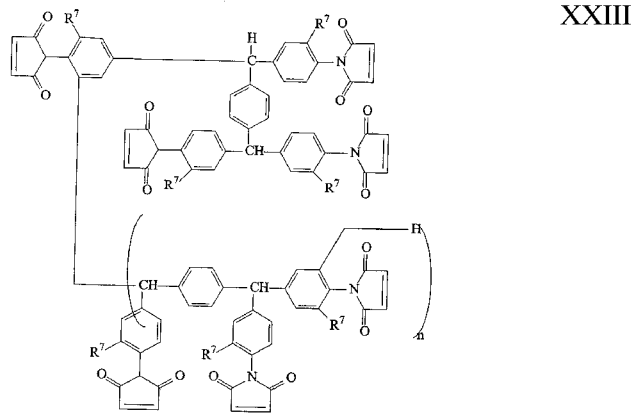

XXIII

UNITED STATES PATENT AND TRADEMARK OFFICE
CERTIFICATE OF CORRECTION

PATENT NO. : 6,043,327
DATED : March 28, 2000
INVENTOR(S) : Attarwala et al.

It is certified that error appears in the above-identified patent and that said Letters Patent is hereby corrected as shown below:

Column 18,
Line 20, delete the formula and replace it with the following:

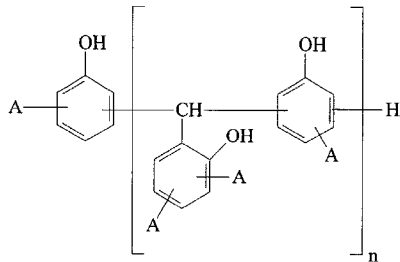

Column 19,
Line 1, delete "the grup consisting of H." and insert therefor -- the group consisting of H. --

Column 23,
Line 42, delete the formula and replace it with the following:

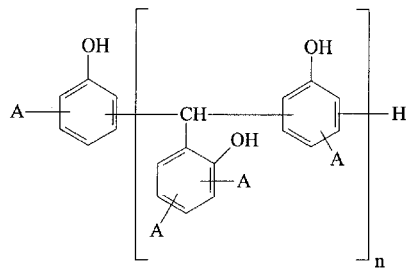

Signed and Sealed this

Eighth Day of October 2002

Attest:

JAMES E. ROGAN
Attesting Officer     Director of the United States Patent and Trademark Office